(12) United States Patent
Kato et al.

(10) Patent No.: US 8,661,097 B2
(45) Date of Patent: Feb. 25, 2014

(54) SERVICE NODE, CONTROL METHOD THEREOF, USER NODE, AND CONTROL METHOD THEREOF

(75) Inventors: Ryoji Kato, Kanagawa (JP); Takeshi Matsumura, Kawasaki (JP); Shingo Murakami, Kanagawa (JP); Toshikane Oda, Tokyo (JP); Shinta Sugimoto, Kanagawa (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 178 days.

(21) Appl. No.: 13/123,251

(22) PCT Filed: Oct. 10, 2008

(86) PCT No.: PCT/JP2008/068914
§ 371 (c)(1),
(2), (4) Date: Apr. 8, 2011

(87) PCT Pub. No.: WO2010/041348
PCT Pub. Date: Apr. 15, 2010

(65) Prior Publication Data
US 2011/0246624 A1    Oct. 6, 2011

(51) Int. Cl.
*G06F 15/16* (2006.01)

(52) U.S. Cl.
USPC .......................................... 709/219; 709/204

(58) Field of Classification Search
None
See application file for complete search history.

(56) References Cited

U.S. PATENT DOCUMENTS

| | | | | |
|---|---|---|---|---|
| 6,085,235 A * | 7/2000 | Clarke et al. | ................... | 709/219 |
| 7,996,538 B2 * | 8/2011 | Kikkawa et al. | ............... | 709/227 |
| 8,059,613 B1 * | 11/2011 | Barrow et al. | ................. | 370/335 |
| 8,082,215 B2 * | 12/2011 | Jung et al. | ........................ | 706/11 |
| 8,150,366 B2 * | 4/2012 | Noguchi et al. | ............ | 455/404.2 |
| 8,160,578 B2 * | 4/2012 | Lindgren | ................... | 455/432.2 |
| 8,214,512 B2 * | 7/2012 | Elburg et al. | ................. | 709/228 |
| 2004/0193727 A1 * | 9/2004 | Varga et al. | .................... | 709/238 |
| 2007/0094691 A1 * | 4/2007 | Gazdzinski | ...................... | 725/62 |
| 2007/0201480 A1 * | 8/2007 | Bao et al. | ..................... | 370/395.2 |
| 2007/0244832 A1 * | 10/2007 | Koskinen et al. | ............... | 705/68 |
| 2008/0235381 A1 * | 9/2008 | Tanizawa et al. | ............. | 709/227 |
| 2008/0255989 A1 * | 10/2008 | Altberg et al. | ................... | 705/40 |
| 2009/0082019 A1 * | 3/2009 | Marsico | ...................... | 455/435.2 |
| 2010/0181373 A1 * | 7/2010 | Murakami et al. | ............ | 235/375 |

FOREIGN PATENT DOCUMENTS

| | | | |
|---|---|---|---|
| JP | 2003348131 A | 12/2003 | |
| JP | 2005175753 A | 6/2005 | |
| WO | 2006/062561 A1 | 6/2006 | |

* cited by examiner

Primary Examiner — Oscar Louie
Assistant Examiner — Younes Naji
(74) Attorney, Agent, or Firm — Coats & Bennett, PLLC (57) ABSTRACT

There is provided a service node that is capable of serving a first user node in a first network including a control node. The first network is capable of communicating with a second network including a second user node. The service node comprises: a request receiving unit that receives a first user identity that identifies the first user node and a second user identity that identifies the second user node; a determining unit that determines whether a received message includes the first user identity as a destination, or the message includes auxiliary information that corresponds to the first user identity; and a modifying unit that modifies the destination of the message to the second user identity and modifies the source of the message to the first user identity in accordance with the determination result by the determining unit.

20 Claims, 9 Drawing Sheets

SERVICE NODE, CONTROL METHOD THEREOF, USER NODE, AND CONTROL METHOD THEREOF

TECHNICAL FIELD

The present invention relates to a service node, a control method thereof, a user node, and a control method thereof. In particular, the present invention relates, but is not limited to, a technology that enables a user node, which can communicate with a given network via a given access network, to be provided with services from the given network via another access network.

BACKGROUND

A network architecture called "IP Multimedia Subsystem" (IMS) has been developed by the 3rd Generation Partnership Project (3GPP) as an open standard for handling multimedia services and sessions in the packet domain (for details regarding IMS, please refer to 3GPP TS 23.228 found at http://www.3gpp.org/ftp/Specs/html-info/22228.htm). Currently, various communication terminals and devices (hereinafter referred to as IMS terminals or User Equipment (UE)) that conform to the IMS standard are known. A typical example of an IMS terminal is a mobile phone with IMS functionality. Personal computers (PCs), personal digital assistants (PDAs), and the like can also serve as IMS terminals if they are equipped with IMS functionality. IMS terminals can provide multimedia services by, for example, receiving video streaming from a video-streaming server over an IMS network.

Generally, UE has IMS subscription information such as an IMS Private User Identity (IMPI) and an IMS Public User Identity (IMPU). The UE can make access to a mobile IMS operator's network (hereinafter referred to as a mobile IMS network) via a mobile access network such as a General Packet Radio Service (GPRS). The mobile IMS network authenticates and authorizes the UE by use of IMS subscription information, and provides the UE with multimedia services such as Voice over IP (VoIP).

When the UE directly accesses the mobile IMS network and is provided with IMS services, the mobile IMS network can control the quality of service (QoS) over the mobile access network.

Meanwhile, UE equipped with a wireless Local Area Network (WLAN) adapter is also known. Such UE can join the LAN, which is connected to a fixed IMS operator's network (hereinafter referred to as a fixed IMS network) via a fixed access network such as a Digital Subscriber Line (DSL).

Because the IMS is an access-agnostic system, UE equipped with WLAN adapters may be provided with IMS services via the fixed IMS network under the condition that the UE can register with the fixed IMS network. The UE can register with the fixed IMS network when the mobile IMS operator of the UE has a roaming agreement with the fixed IMS operator, when the fixed IMS operator is the same as the mobile IMS operator of the UE (i.e., the IMS subscription information of the UE is also valid for the fixed IMS network), or the like. In these cases, the fixed IMS network can control QoS over the fixed access network when the UE accesses the fixed IMS network and is provided with IMS services.

However, a problem arises if no roaming agreement exists and the IMS subscription information of the UE is not valid for the fixed IMS network. In this case, the UE cannot be provided with IMS services via the fixed IMS network because the fixed IMS network rejects an initial IMS Registration request from the UE.

Figure 1:
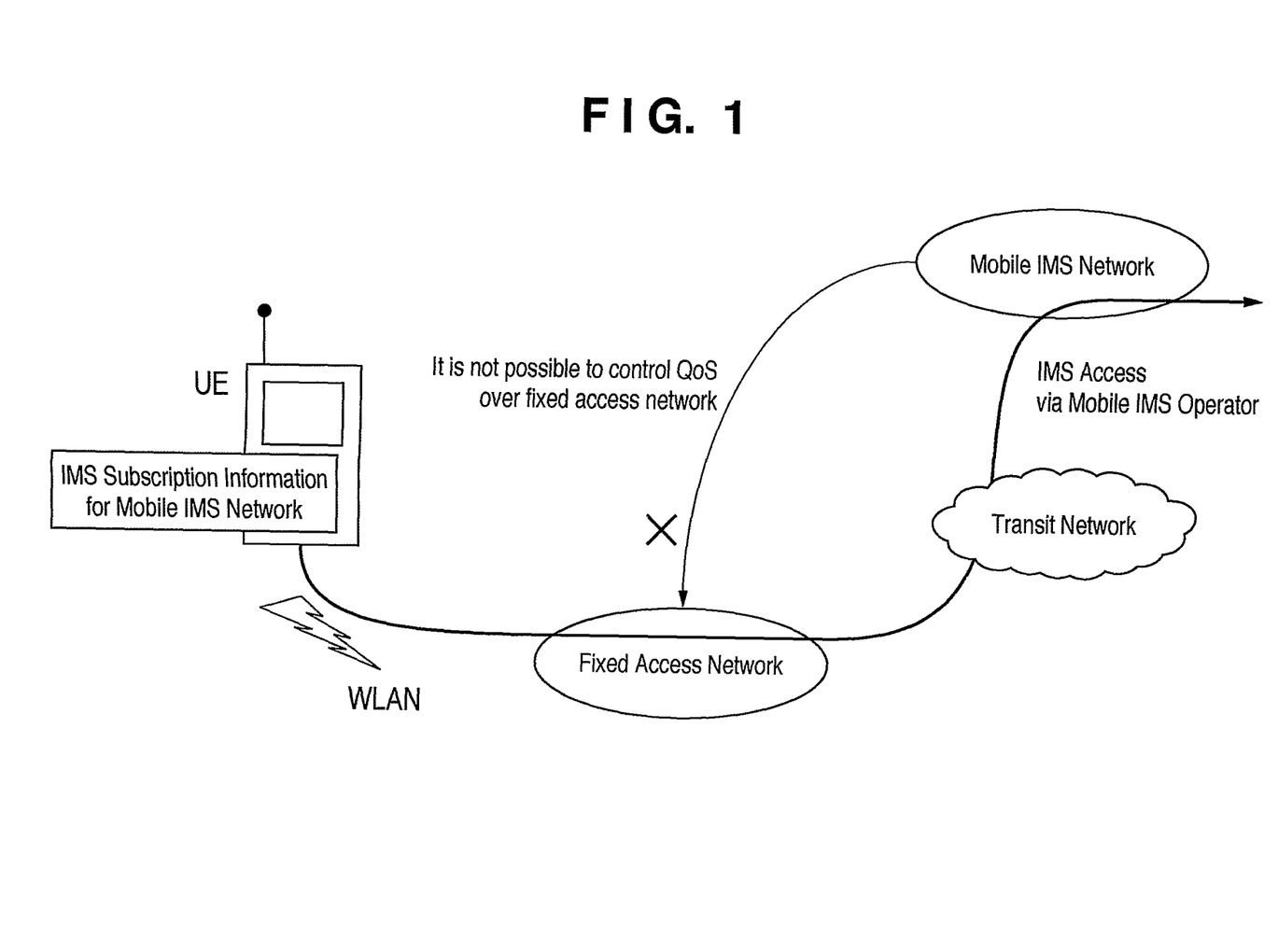
FIG. 1 schematically illustrates the problem arising in the conventional art.

In some situations (e.g., in the case that an IMS Subscriber Identity Module (ISIM) application of the UE contains an address of the P-CSCF of the mobile IMS network), the UE can register with and access the mobile IMS network via the fixed access network using its IMS subscription information. In this case the UE can be provided with IMS services from the mobile IMS network via the fixed access network. However, QoS is not guaranteed because the mobile IMS network does not have privileges to control QoS over the fixed access network (see FIG. 1).

SUMMARY

The present invention is intended to address the above-described problem, and it is a feature thereof to introduce a technology that enables a user node (e.g., a UE), which can communicate with a given network (e.g., a mobile IMS network) via a given access network (e.g., a mobile access network), to be provided with services from the given network via another access network (e.g., a fixed access network).

According to a first aspect of the present invention, there is provided a service node that is capable of serving a first user node in a first network including a control node, wherein the first network is capable of communicating with a second network including a second user node, the service node comprising:

a request receiving unit that receives, from the first user node, a redirection request including a first user identity that identifies the first user node in the first network and a second user identity that identifies the second user node in the second network;

a storing unit that stores an association of the first user identity and the second user identity;

a message receiving unit that receives a message from the control node;

a determining unit that determines whether the message includes the first user identity as a destination, or the message includes auxiliary information that corresponds to the first user identity;

a modifying unit that
modifies the destination of the message to the second user identity based on the association if the determining unit determines that the message includes the first user identity as the destination, and
modifies a source of the message to the first user identity based on the auxiliary information if the determining unit determines that the message includes the auxiliary information; and a sending unit that sends the modified message to the control node.

According to a second aspect of the present invention, there is provided a method for controlling a service node that is capable of serving a first user node in a first network including a control node, wherein the first network is capable of communicating with a second network including a second user node, the method comprising:

receiving, from the first user node, a redirection request including a first user identity that identifies the first user node in the first network and a second user identity that identifies the second user node in the second network;

storing an association of the first user identity and the second user identity;

receiving a message from the control node;

determining whether the message includes the first user identity as a destination, or the message includes auxiliary information that corresponds to the first user identity;

modifying the destination of the message to the second user identity based on the association if the determining determines that the message includes the first user identity as the destination;

modifying a source of the message to the first user identity based on the auxiliary information if the determining determines that the message includes the auxiliary information; and sending the modified message to the control node.

According to a third aspect of the present invention, there is provided a user node that is capable of communicating with a service node and a first control node in a first network and another user node in a second network that includes a second control node, the user node comprising:

a retrieving unit that retrieves, from a memory, a first user identity that identifies the user node in the first network;

a user identity receiving unit that receives, from the other user node, a second user identity that identifies the other user node in the second network;

a registering unit that registers the second user identity with the second control node via the other user node;

a request sending unit that sends, to the service node, a redirection request including the first user identity and the second user identity; and a message sending unit that sends, to the other user node, a message including a service node identity that identifies the service node in the first network such that the service node identity causes the first control node to route the message to the service node, and including auxiliary information that corresponds to the first user identity.

According to a fourth aspect of the present invention, there is provided a method for controlling a user node that is capable of communicating with a service node and a first control node in a first network and another user node in a second network that includes a second control node, the method comprising:

retrieving, from a memory, a first user identity that identifies the user node in the first network;

receiving, from the other user node, a second user identity that identifies the other user node in the second network;

registering the second user identity with the second control node via the other user node;

sending, to the service node, a redirection request including the first user identity and the second user identity; and sending, to the other user node, a message including a service node identity that identifies the service node in the first network such that the service node identity causes the first control node to route the message to the service node, and including auxiliary information that corresponds to the first user identity.

The main advantage of the present invention is as follows. A user node (e.g., a UE), which can communicate with a given network (e.g., a mobile IMS network) via a given access network (e.g., a mobile access network), can be provided with services from the given network via another access network (e.g., a fixed access network), because the service node in the given network modifies the destination or the source of the message involving the user node.

Further features of the present invention will become apparent from the following description of exemplary embodiments with reference to the attached drawings, in which like reference characters designate the same or similar parts throughout the figures thereof.

DETAILED DESCRIPTION

Figure 2:
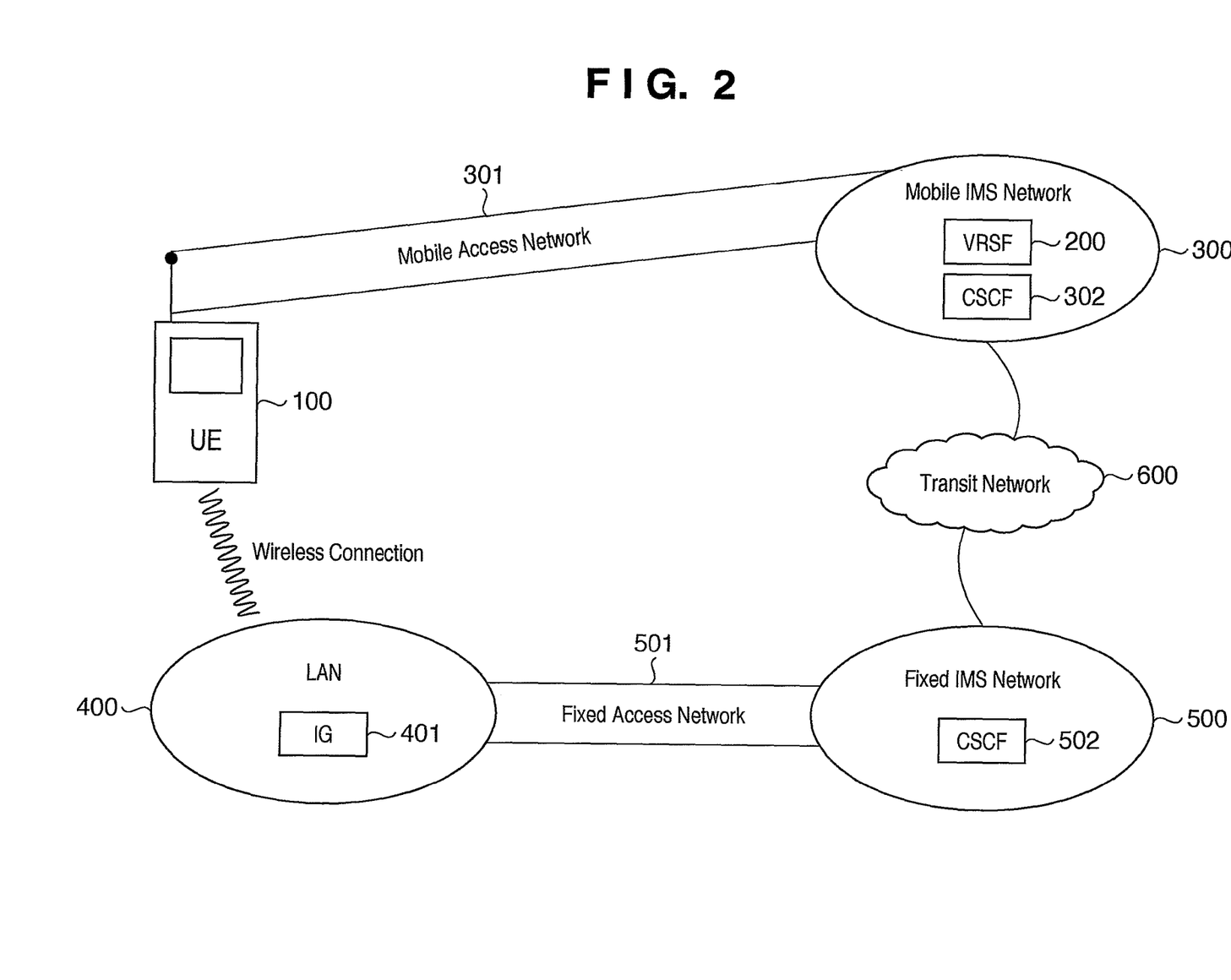
FIG. 2 is a schematic diagram illustrating the network configuration according to an exemplary embodiment of the present invention.

FIG. 2 is a schematic diagram illustrating the network configuration according to an exemplary embodiment of the present invention.

In FIG. 2, a User Equipment (UE) 100 communicates with a mobile IMS network 300 via a mobile access network 301. The detailed configuration of the UE 100 will be described later with reference to FIG. 3. The UE 100 also communicates with a Local Area Network (LAN) 400 via a wireless LAN (WLAN) adapter (not shown in FIG. 2). Although it is assumed that the UE 100 wirelessly communicates with the LAN 400 in the present embodiment, the UE 100 may have a wired connection to the LAN 400.

The LAN 400 communicates with a fixed IMS network 500 via a fixed access network 501. The mobile IMS network 300 and the fixed IMS network can communicate with each other via a transit network 600.

For example, the mobile access network 301 may be implemented using a General Packet Radio Service (GPRS), and the fixed access network 501 may be implemented using a Digital Subscriber Line (DSL).

The mobile IMS network 300 comprises a Virtual Roaming Support Function (VRSF) 200. The VRSF 200 is one of the key nodes which enable the GE 100 to be provided with IMS services from the mobile IMS network 300 via the fixed access network 501 (this scheme is called a "virtual roaming" in the present application). The detailed configuration of the VRSF 200 will be described later with reference to FIG. 4.

The mobile IMS network 300 also comprises a Call Session Control Function (CSCF) 302. To be exact, a CSCF typically comprises a Proxy CSCF (P-CSCF), an Interrogating CSCF (I-CSCF), and a Serving CSCF (S-CSCF). However, for the sake of simplicity, these are generally referred to as a CSCF in the present application unless a precise distinction is necessary.

The LAN 400 comprises an IMS Gateway (IG) 401. The IG 401 is a kind of a UE and a basic configuration thereof is known in the art (see WO 2006/045706, for example). In particular, the IG 401 has a network adapter to perform communication with the fixed IMS network 500 via the fixed access network 501. The IG 401 also has an ISIM application containing one IMPI and one or more IMPUs. The IG 401 can register with the fixed IMS network 500 (to be exact, a CSCF 502 of the fixed IMS network 500) using one of the IMPUs, and the fixed IMS network 500 can control QoS over the fixed access network 501 with regard to the communication between the IG 401 and the fixed IMS network 500. It should be noted that although the basic configuration of the IG 401 is known in the art, several operations (for example, operations performed in steps S503-505 and S601-602 described later) are novel and unique to the present invention.

Figure 3:
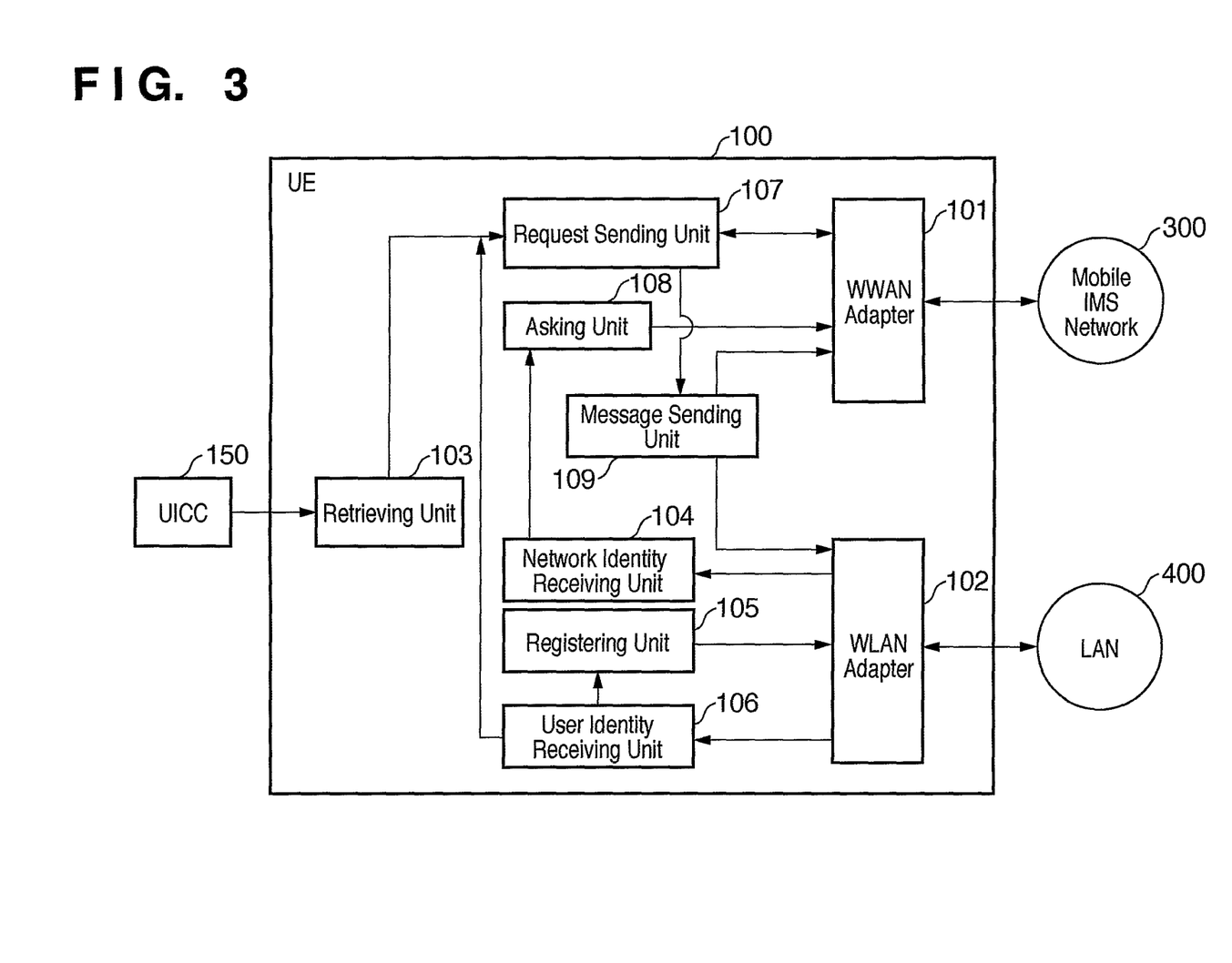
FIG. 3 is a functional block diagram of the User Equipment (UE) according to the exemplary embodiment of the present invention.

FIG. 3 is a functional block diagram of the UE 100 according to the exemplary embodiment of the present invention. The UE 100 may, for example, be a mobile phone. The functionality of each block in the UE 100 may be implemented by dedicated hardware, software executed by a processor (not shown) or a combination thereof.

In FIG. 3, a wireless Wide Area Network (WWAN) adapter 101 is a network adapter which performs communication with the mobile IMS network 300 in accordance with a communications standard such as the Global System for Mobile Communication (GSM), Wideband Code Division Multiple Access (WCDMA), CDMA2000, or the like. A WLAN adapter 102 is a network adapter which performs communication with the LAN 400 in accordance with a communications standard such as IEEE802.11a/b/g.

A retrieving unit 103 comprises a memory slot to which a memory is inserted, and retrieves IMS subscription information from the memory. In the present embodiment, the memory is a Universal Integrated Circuit Card (UICC) 150 that stores an ISIM application containing the IMS subscription information. The IMS subscription information includes one IMPI and one or more IMPUs, and identifies the UE 100 in the mobile IMS network 300.

Although it is assumed that the ISIM application is implemented in the UICC 150 that is physically inserted in the UE 100, the ISIM application may be implemented in another form. For example, an ISIM application may be realized as a remotely managed software object that is downloadable via a network to a trusted execution environment of the UE 100, or it may be implemented within an embedded chip (also called Industrial Form Factor) within the UE 100, that may possibly be remotely managed.

In the present embodiment, it is assumed that the UE 100 joins the LAN 400 by means of wireless communication, and virtually roams into the fixed IMS network 500 via the LAN 400 and the fixed access network 501 in order to be provided with services from the mobile IMS network 300. However, the types of networks and access technologies are not limited thereto. If different types of networks or access technologies are employed, some of components of the network configuration in FIG. 2 are modified accordingly. For example, if the fixed access network 501 is replaced with a given wireless network, the IG 401 will have a network interface to perform communication via the given wireless network.

However, it should be noted that the scenario of the present embodiment is particularly advantageous because the fixed access network usually has greater bandwidth than the mobile access network. Accordingly, the user of the UE 100 may prefer to roam into the fixed IMS network 500 when the user wants to enjoy bandwidth-consuming IMS services such as video streaming.

A network identity receiving unit 104, a registering unit 105, and a user identity receiving unit 106 communicate with the IG 401 in the LAN 400 via the WLAN adapter 102. A request sending unit 107 and an asking unit 108 communicate with the VRSF 200 in the mobile IMS network 300 via the WWAN adapter 101. A message sending unit 109 communicates with the IG 401 in the LAN 400 via the WLAN adapter 102, and may also communicate with the CSCF 302 in the mobile IMS network 300 via the WWAN adapter 101. The operations of each unit will be described later with reference to FIGS. 5-9.

Figure 4:
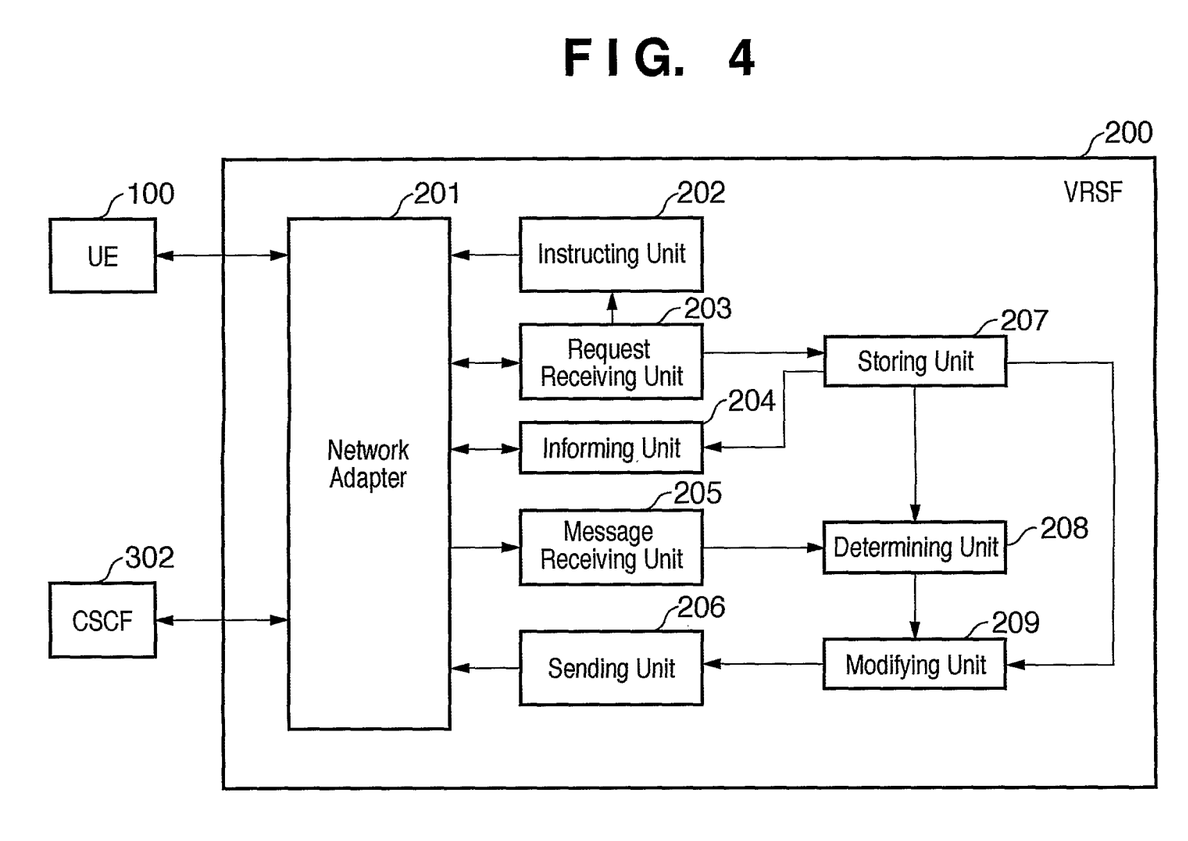
FIG. 4 is a functional block diagram of the Virtual Roaming Support Function (VRSF) according to the exemplary embodiment of the present invention.

FIG. 4 is a functional block diagram of the VRSF 200 according to the exemplary embodiment of the present invention. The VRSF 200 may, for example, be a type of an IMS application server (IMS). Alternatively, it may be integrated in the CSCF 302. The functionality of each block in the VRSF 200 may be implemented by dedicated hardware, software executed by a processor (not shown) or a combination thereof.

In FIG. 4, a network adapter 201 performs communication with the UE 100 and the CSCF 302.

An instructing unit 202, a request receiving unit 203, an informing unit 204, a message receiving unit 205, and sending unit 206 communicate with at least one of the UE 100 and the CSCF 302 via the network adapter 201. A storing unit 207, a determining unit 208, and a modifying unit 209 perform predetermined operations in the VRSF 200. The operations of each unit will be described later with reference to FIGS. 5-9.

Figure 5:
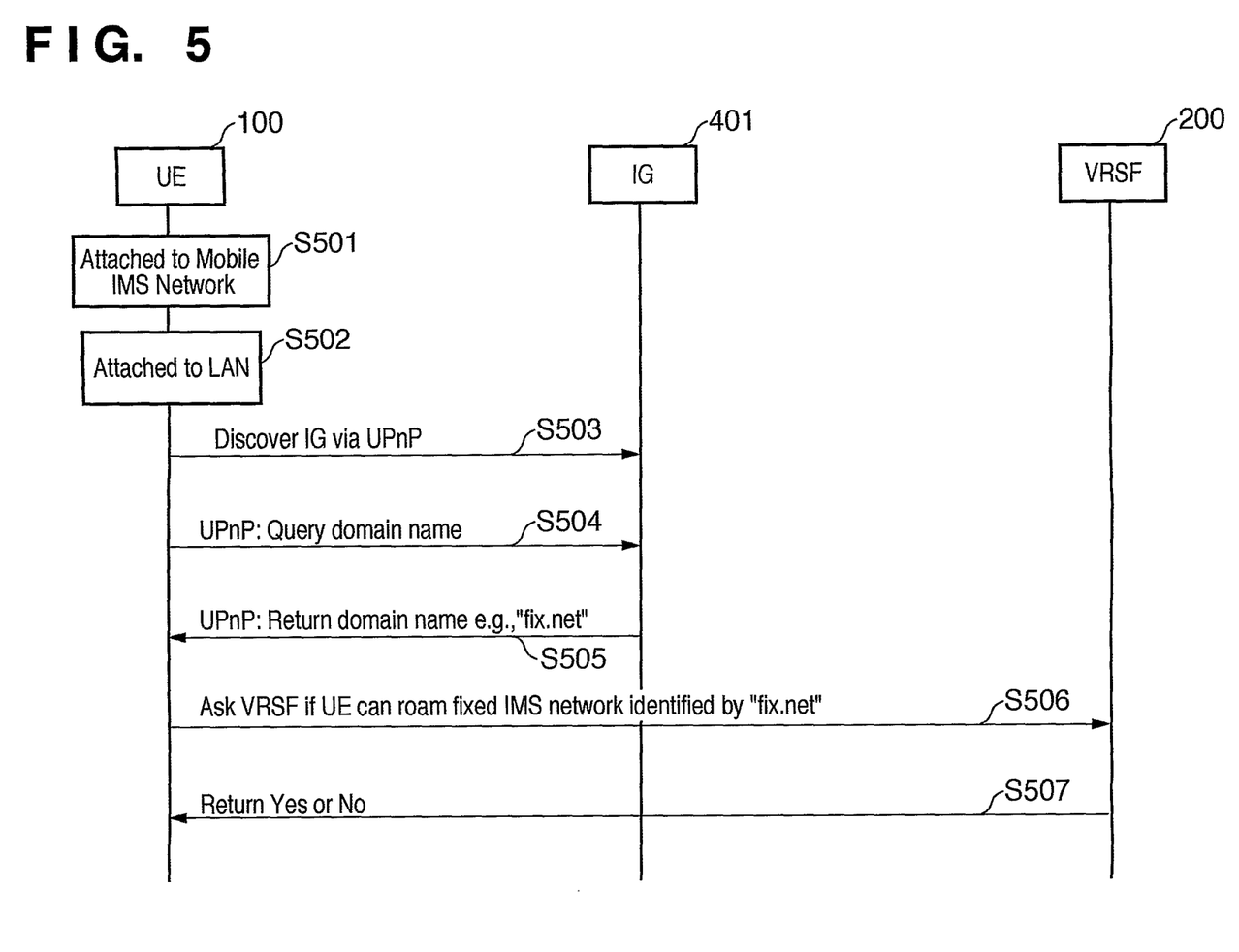
FIG. 5 is a sequence diagram illustrating a flow of processing whereby the UE determines whether or not the fixed IP Multimedia System (IMS) network has a roaming agreement with the mobile IMS network according to the exemplary embodiment of the present invention.

FIG. 5 is a sequence diagram illustrating a flow of processing whereby the UE 100 determines whether or not the fixed IMS network 500 has a roaming agreement with the mobile IMS network 300 according to the exemplary embodiment of the present invention.

In step S501, the retrieving unit 103 of the UE 100 (see FIG. 3) retrieves the IMS subscription information from the UICC 150. Then, the UE 100 is attached to the mobile IMS network 300 by registering the IMS subscription information with the CSCF 302 via the WWAN adapter 101.

In step S502, the UE 100 is attached to the LAN 400 by means of the WLAN adapter 102, and obtains a local IP address in the LAN 400 using, for example, the Dynamic Host Configuration Protocol (DHCP). In the present embodiment, it is assumed that the UE 100 remains attached to the mobile IMS network 300 even when it is virtually roaming into the fixed IMS network 500.

In step S503, the UE 100 discovers the IG 401 in the LAN 400 through the Universal Plug and Play (UPnP) discovery mechanism. Although it is assumed that communication between the UE 100 and the IG 401 is performed based on the UPnP mechanisms in the present embodiment, other mechanisms are also applicable if the UE 100 and the IG 401 are suitably configured.

In step S504, the network identity receiving unit 104 sends a UPnP action request to query the IG 401 about a domain name of the fixed IMS network 500 for which the IG 401 has a valid IMS subscription information.

In step S505, in response to the request in step S504, the IG 401 returns the domain name (e.g., "fix.net"). In this step, the IG 401 can retrieve the domain name from the IMS subscription information stored in the IG 401. For example, the IMS subscription information is stored in an ISIM application.

In step S506, the asking unit 108 asks the VRSF 200 whether or not the UE 100 can roam into the fixed IMS network 500 identified by "fix.net". In other words, the asking unit 108 asks the VRSF 200 whether or not the fixed IMS network 500 has a roaming agreement with the mobile IMS network 300. Note that an address of the VRSF 200 may be pre-configured in the ISIM application of the UICC 150. In this step, the VRSF 200 can authenticate a source (i.e., the UE 100) of this query if it receives the query from the mobile access network 301, which is generally an authenticated channel. Alternatively, the VRSF 200 can authenticate the UE 100 if the query is received via another authenticated channel such as a Ut interface protected by the Generic Bootstrapping Architecture (GBA) between the VRSF 200 (acting as a GBA Network Application Function (NAF)) and the UE 100.

In step S507, the informing unit 204 of the VRSF 200 (see FIG. 4) determines whether or not the domain name received in step S506 is stored in the storing unit 207. If the domain name is stored, the informing unit 204 returns an answer indicating that the UE 100 can roam into the network identified by "fix.net"; otherwise the informing unit 204 returns an answer indicating that the UE 100 cannot roam into the network identified by "fix.net".

It is advantageous for the UE 100 to know whether or not it can roam into the fixed IMS network 500 because it can avoid virtual roaming cases where it can roam into the fixed IMS network 500.

In some embodiments, the UE 100 may determine whether or not the fixed IMS network 500 has a roaming agreement with the mobile IMS network 300 by alternative mechanisms. For example, the UE 100 may obtain an address of the P-CSCF of the fixed IMS network 500 by broadcasting a DHCP request with a DHCP option for Session Initiation Protocol (SIP) servers (see RFC 3361 "DHCP Option for SIP Servers" for the detailed information). In this case, a residential gateway collocated with the IG 401 acts as a DHCP (relay) server within a home, advertising the P-CSCF address to other IMS UEs in the LAN 400. However, this mechanism may lead to a problem in that the DHCP server likely advertises not only a P-CSCF address but also its own SIP proxy server address (i.e., IG's B2BUA SIP server address) to support plain SIP client devices. When the UE 100 receives two SIP server addresses (or host domain names), it cannot know which one is the P-CSCF address in general because there is no standard or established way to know this. Hence, this efficiently works in a limited environment where the DHCP server advertises only the P-CSCF address through the DHCP option. In this case, the UE 100 can know that it can roam into the fixed IMS network if the IMS registration request to that P-CSCF address is successful; if the IMS registration request fails, the UE 100 will know that the roaming is not possible.

Alternatively, the UE 100 may inquire of the IG 401 as to whether or not the UE can roam into the fixed IMS network 500 by presenting a domain name of the mobile IMS network 300. In this case, the IG 401 sends a query to a functional entity, which is similar to the VRSF 200, of the fixed IMS network 500 regarding whether or not the fixed IMS network 500 accepts roaming from the specified mobile IMS network 300 (alternatively, the IG 401 may be provisioned in advance with a list of mobile IMS networks with which the fixed IMS network 500 of the IG 401 has a roaming agreement). The IG 401 then returns to the UE 100 an answer indicating the availability of roaming.

Figure 6:
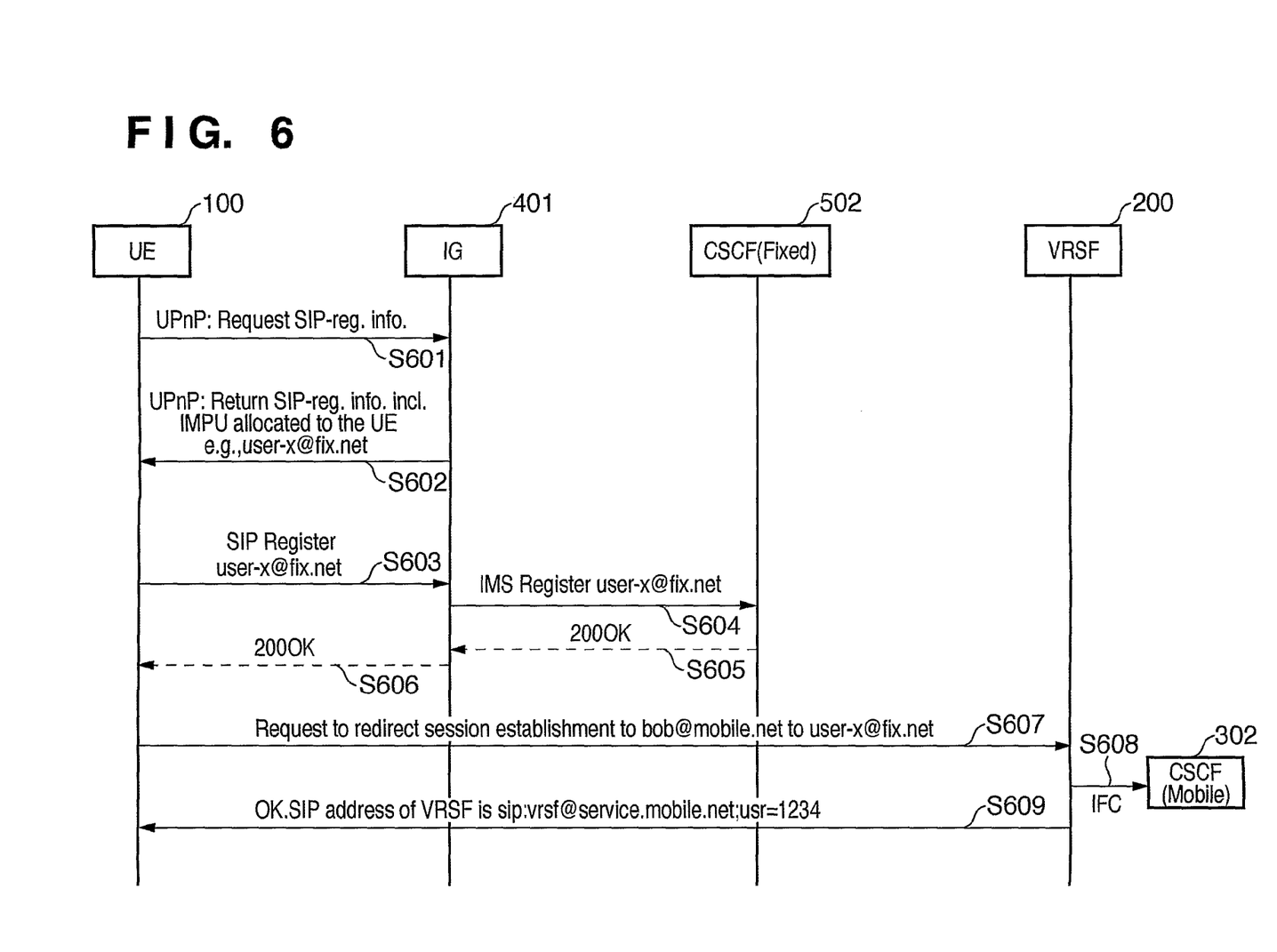
FIG. 6 is a sequence diagram illustrating a flow of processing whereby the UE initiates virtual roaming according to the exemplary embodiment of the present invention.

FIG. 6 is a sequence diagram illustrating a flow of processing whereby the UE 100 initiates virtual roaming according to the exemplary embodiment of the present invention.

In step S601, the user identity receiving unit 106 of the UE 100 sends a UPnP action request for necessary information for the UE 100 to perform SIP registration to the IG 401.

In step S602, the IG 401 returns, to the identity receiving unit 106, information that includes a SIP server address of the IG 401 and an IMPU (e.g., "sip:user-x@fix.net") that is allocated to the UE 100 by the IG 401. The UE 100 uses this IMPU for subsequent IMS communication through the IG 401.

The response may also contain a list of the IMS services (e.g., IMS Communication Service Identifiers (ICSIs)) which the IG 401 can support (for detail regarding the ICSI, please refer to 3GPP TS 23.228 found at http://www.3gpp.org/ftp/Specs/html-info/22228.htm). It should be noted that there may be cases where the IG 401 is authorized to use only limited types of IMS services using the IMS subscription information of the IG 401. In this case, the UE 100 may use only the authorized IMS services through the fixed access network 501; the other services are accessed via the mobile access network 301.

In step S603, the registering unit 105 sends a SIP Register message to the IG 401. The SIP Register message includes the IMPU received in step S602.

In step S604, the IG 401 converts the SIP Register message into an IMS SIP Register message and sends it to the CSCF 502.

In steps S605-S606, the corresponding 200 OK message is returned from the CSCF 502 to the UE 100 via the IG 401.

In step S607, the request sending unit 107 a redirection request to the VRSF 200. The redirection request includes the IMPU of the UE 100 (e.g., "bob@mobile.net") and the IMPU received in step S602 (e.g., "user-x@fix.net"). The redirection request instructs the VRSF 200 to redirect session establishments addressed to "bob@mobile.net" to "user-x@fix.net". The request receiving unit 203 of the VRSF 200 (see FIG. 4) receives the redirection request, and the storing unit 207 stores this association.

The redirection request may contain any additional settings such as what particular IMS services should be redirected by, for example, specifying all or a part of the ICS's received in step S602. Another possible setting is that the UE 100 wants to receive only bandwidth-consuming IMS services like IPTV through the fixed access network 501 and wants to receive other non-QoS-sensitive IMS services like messaging services through the mobile access network 301. These settings are also stored in the storing unit 207.

The protocol to implement this redirection request may be XCAP over a Ut interface which is protected by GBA. Alternatively, an IMS SIP Register request over the mobile access network 301 may be used to carry this redirection request (e.g., the Contact header of the SIP Register request carries "user-x@fix.net").

In step S608, the instructing unit 202 instructs the CSCF 302 (to be precise, S-CSCF) that is currently serving the UE 100 to add an initial filter criteria (IFC) Trigger Point of any service profiles for "bob@mobile.net". The added Trigger Point is to make incoming SIP requests addressed to "bob@mobile.net" be forwarded to the VRSF 200 by the CSCF 302 so that the VRSF 200 performs necessary processing for realizing virtual roaming. Alternatively, the IFC for "bob@mobile.net" may be statically pre-configured to contain this trigger point for the VRSF 200, that is, incoming SIP requests to "bob@mobile.net" are always forwarded to the VRSF 200 regardless of whether or not the UE 100 is virtually roaming into the fixed IMS network 500. In this way, the VRSF 200 has a function to request modifications to the service profile or more specifically modifications to the IFCs for the UE 100. The modifications include addition of some new IFCs and deletion of some existing IFCs.

In step S609, the request receiving unit 203 generates a user-specific identifier (e.g., "1234"), and returns a SIP address of the VRSF 200 containing the user-specific identifier. For example, "sip:vrsf@service.mobile.net;usr=1234" is returned to the UE 100. The association between the user-specific identifier and the IMPU of the UE 100 is also stored in the storing unit 207 so that the VRSF can later identify the UE 100 based on the user-specific identifier.

As a result, the UE 100 gets ready to perform the virtual roaming.

Figure 7:
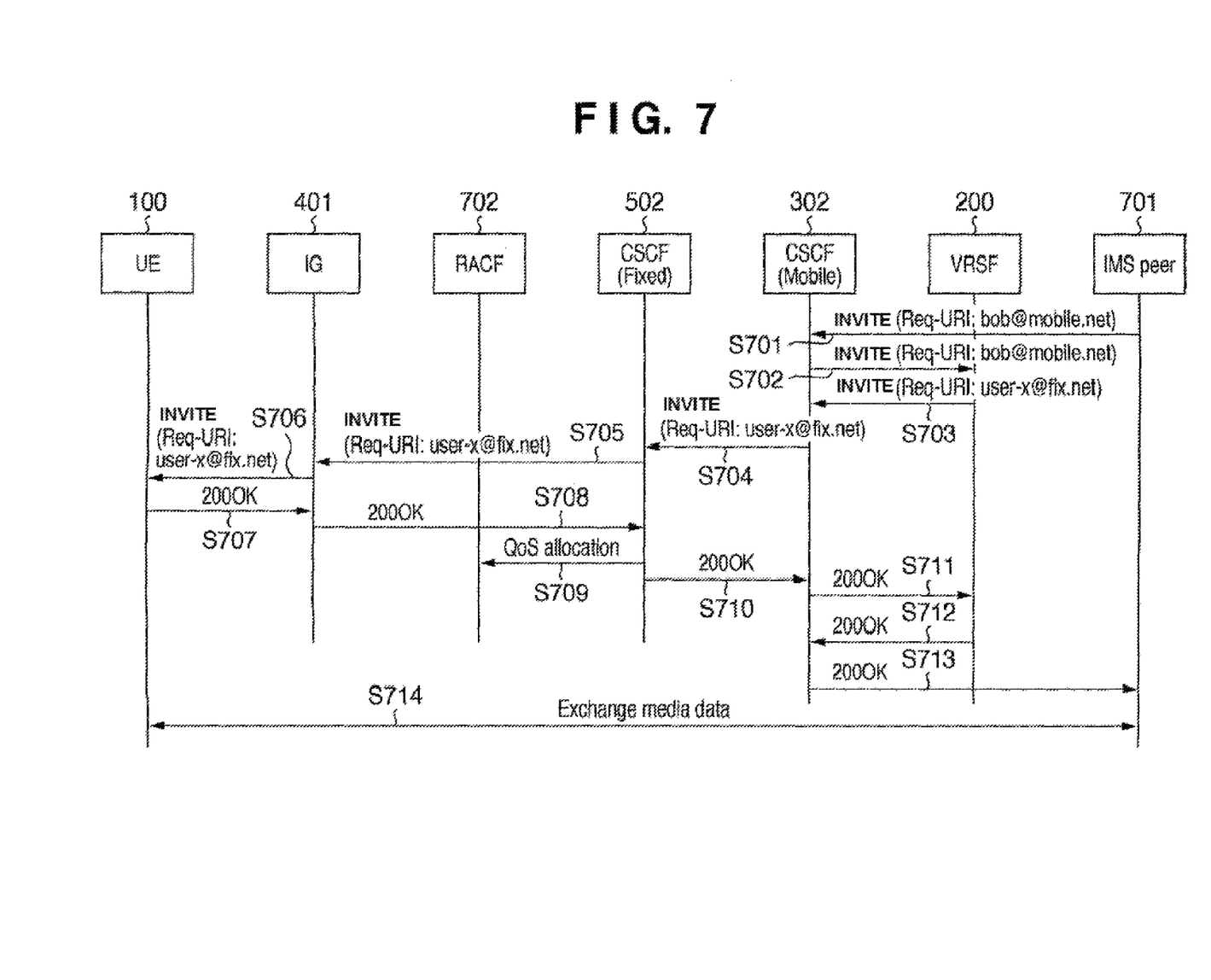
FIG. 7 is a sequence diagram illustrating how the incoming call to the UE 100 is processed in the virtual roaming environment according to the exemplary embodiment of the present invention.

FIG. 7 is a sequence diagram illustrating how the incoming call to the UE 100 is processed in the virtual roaming environment according to the exemplary embodiment of the present invention.

In step S701, the IMS peer 701, which is another UE for example, sends a SIP INVITE message addressed to bob@mobile.net to the CSCF 302.

In step S702, the CSCF 302 forwards the SIP INVITE message to the VRSF 200 (in accordance with the IFC configured in step S608). The message receiving unit 205 of the VRSF 200 (see FIG. 4) receives the SIP INVITE message.

In step S703, the determining unit 208 determines whether or not the SIP INVITE message includes the IMPU of the UE 100 as a destination with reference to the storing unit 207. In this example, the UE 100 is virtually roaming into the fixed IMS network 500, and the association between bob@mobile.net and user-x@fix.net is stored in the storing unit 207. Accordingly, the modifying unit 209 modifies the Request-URI (i.e., the destination) of the SIP INVITE message to user-x@fix.net. Then, the sending unit 206 sends the modified SIP INVITE message to the CSCF 302.

Note that the VRSF 200 performs this redirection (i.e., modification) only when the incoming SIP INVITE message meets the settings which have been made during step S607 of FIG. 6. That is, the modifying unit 209 checks a service type identified by the SIP INVITE message, and modifies the SIP INVITE message under the condition that this service type is stored in the storing unit 207 in step S607. For example, when an IMS service that the incoming SIP INVITE message is requesting is one that is not supported for "user-x@fix.net", the VRSF 200 returns the SIP INVITE message to the CSCF 302 without modification. Then, the SIP INVITE message is sent to the UE 100 via the mobile access network 301.

In steps S704-S706, the modified SIP INVITE message is forwarded to the UE 100 via the CSCF 502 and the IG 401. Accordingly, the UE 100 can receive the incoming call through the fixed access network 501.

In steps S707-S708, the UE 100 responds to the SIP INVITE message with a 200 OK message. The 200 OK message is eventually received by the CSCF 502 via the IG 401.

In step S709, the CSCF 502 instructs the Resource Admission Control Function (RACF) 702 to allocate the required QoS to the session established by the above INVITE transaction. Accordingly, the QoS over the fixed access network 501 is controlled in the virtual roaming environment.

In steps S710-S713, the 200 OK message is eventually received by the IMS peer 701.

In step S714, the UE 100 and the IMS peer 701 start exchanging media data under QoS control over the fixed access network 501.

Figure 8:
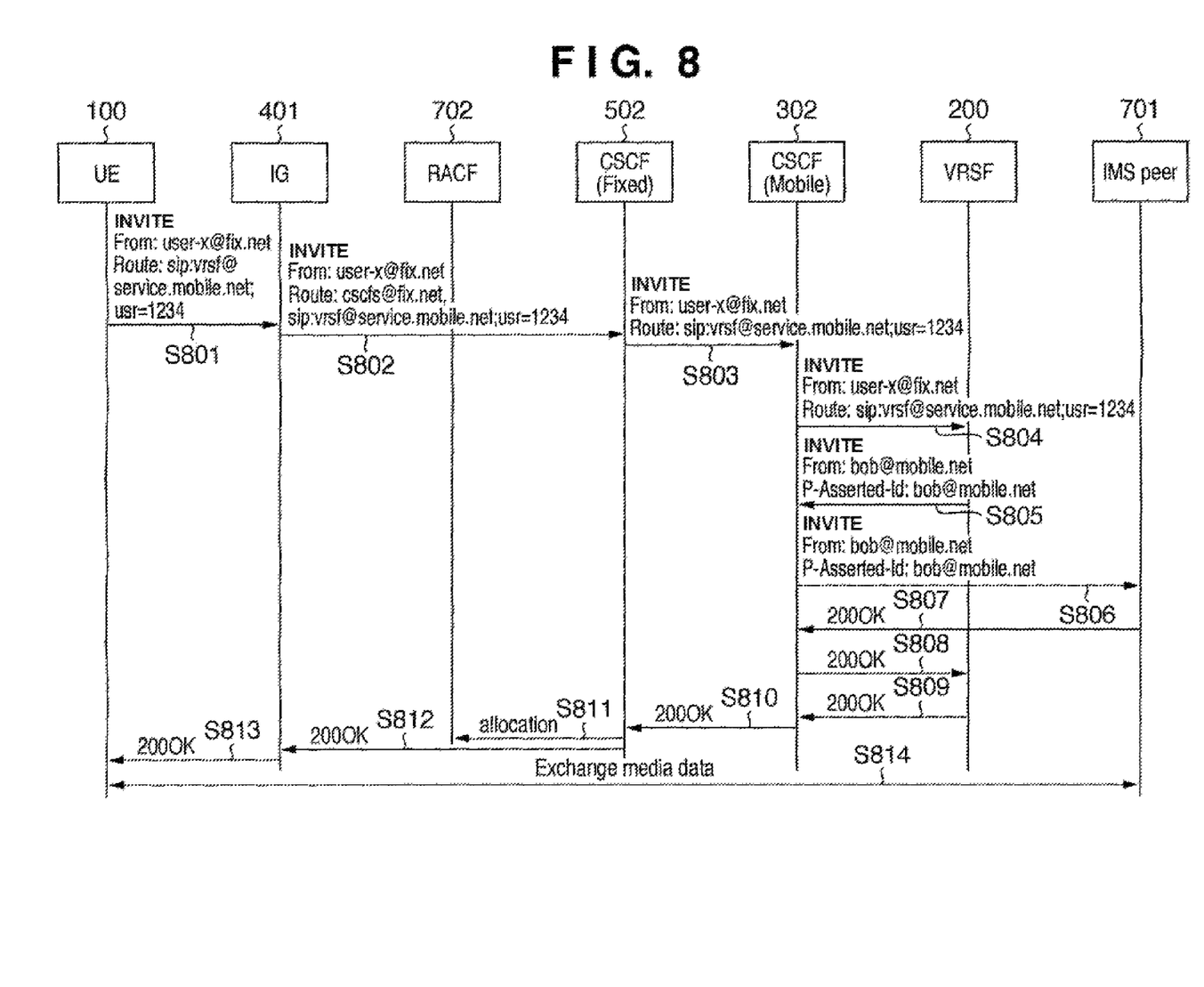
FIG. 8 is a sequence diagram illustrating how the outgoing call from the UE is processed in the virtual roaming environment according to the exemplary embodiment of the present invention.

FIG. 8 is a sequence diagram illustrating how the outgoing call from the UE 100 is processed in the virtual roaming environment according to the exemplary embodiment of the present invention.

In step S801, the message sending unit 109 of the UE 100 (see FIG. 3) generates a SIP INVITE message addressed to the IMS peer 701. The message sending unit 109 sets the From header to be the IMPU allocated by the IG 401, that is, user-x@fix.net. In addition, the message sending unit 109 causes the SIP INVITE message to have the SIP address of the VRSF 200, which is received in step S609 of FIG. 6, in a Route header field. This causes the SIP INVITE message be routed to the VRSF 200 before reaching the destination. Then, the message sending unit 109 sends the generated SIP INVITE message to the IG 401.

It should be noted that the message sending unit 109 may use the IMPU of the UE 100 (i.e., "bob@mobile.net") as auxiliary information instead of the user-specific identifier generated by the request receiving unit 203 in step S609 (i.e., "1234"). What is important here is that the auxiliary information can identify the UE 100.

In addition, it should be noted that the SIP INVITE message may have bob@mobile.net in the From header field instead of user-x@fix.net, because a From header field is purely used to carry a logical caller identity and is not used for SIP routing. However, because such a topologically incorrect From header sometimes causes a problem, it is preferable that the SIP INVITE message has user-x@fix.net in the From header field when the UE 100 is virtually roaming into the fixed IMS network 500.

Furthermore, if the UE 100 does not want to initiate the service in the virtual roaming environment (for example, if the service type of the service requested by the SIP INVITE message is not included in ICSIs received in step S602 of FIG. 6), the message sending unit 109 generates and sends a SIP INVITE message via the mobile access network 301 in the conventional manner.

In step S802, the IG 401 receives the SIP INVITE message, and inserts necessary CSCF addresses of the fixed IMS network 500 in the Route header field before the address of the VRSF 200. This causes the SIP INVITE message be routed to the fixed IMS network 500 first. Then, the IG 401 sends the SIP INVITE message to the CSCF 502.

In step S803, the CSCF 502 consumes the relevant Route header (i.e., cscfs@fix.net in the example of FIG. 8). According to the remaining Route header (i.e., sip:vrsf@service.mobile.net;user=1234 in the example of FIG. 8), the CSCF 502 forwards the SIP INVITE message to the CSCF 302.

In step S804, the CSCF 302 forwards the SIP INVITE message to the VRSF 200 according to the Route header. The message receiving unit 205 of the VRSF 200 (see FIG. 4) receives the SIP INVITE message.

In step S805, the determining unit 208 determines whether or not the SIP INVITE message includes the auxiliary information with reference to the storing unit 207. In this example, because the UE 100 is virtually roaming into the fixed IMS network 500, the auxiliary information included in the SIP INVITE message is stored in the storing unit 207. Moreover, the association between auxiliary information (i.e., "1234") and bob@mobile.net is also stored in the storing unit 207. Accordingly, the determining unit 208 recognizes that the calling entity is the UE 100. Then, the modifying unit 209 modifies the From header field (i.e., the source) of the SIP INVITE message to bob@mobile.net. The modifying unit 209 also inspects a P-Asserted-Identity header of the SIP INVITE message, which may be added by the CSCF 502, to verify that the SIP INVITE message is really sent from user-x@fix.net. Then, the modifying unit 209 modifies the content of the P-Asserted-Identity header to bob@mobile.net (alternatively, the modifying unit 209 adds the P-Asserted-Identity header with bob@mobile.net if it does not exist). After that, the sending unit 206 sends the modified SIP INVITE message to the CSCF 302.

In step S806, the CSCF 302 forwards the SIP INVITE message to the destination IMS peer 701.

In steps S807-S810, the IMS peer 701 responds to the SIP INVITE with a 200 OK message which is eventually received by the CSCF 502 in a way similar to the case of an incoming call (see FIG. 7).

In step S811, the CSCF 502 instructs the RACF 702 to allocate the required QoS to the session established by the above INVITE transaction. Accordingly, the QoS over the fixed access network 501 is controlled in the virtual roaming environment.

In steps S812-S813, the 200 OK message is eventually received by the UE 100.

In step S814, the UE 100 and the IMS peer 701 start exchanging media data under QoS control over the fixed access network 501.

Figure 9:
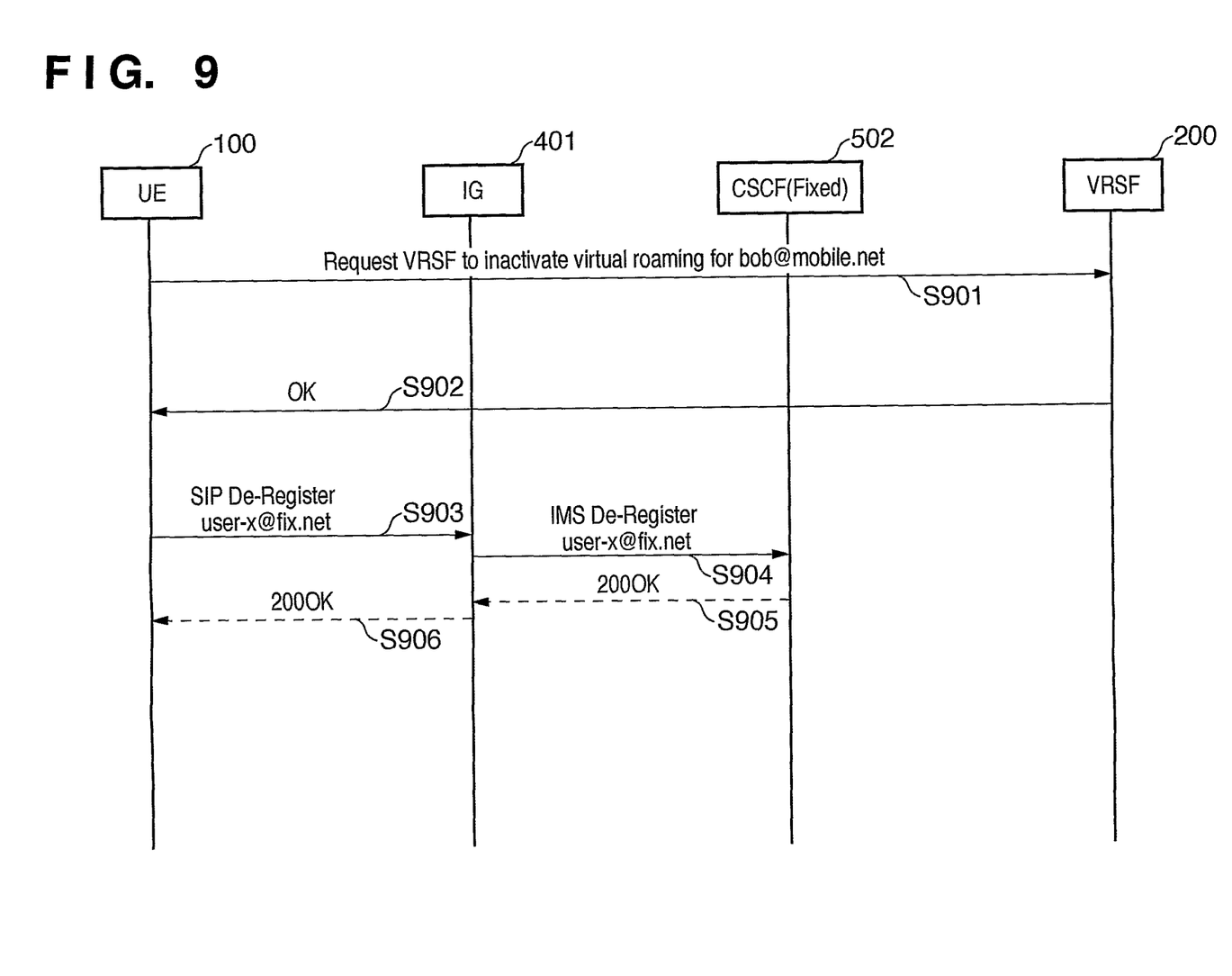
FIG. 9 is a sequence diagram illustrating a flow of processing whereby the UE 100 terminates the virtual roaming according to the exemplary embodiment of the present invention.

FIG. 9 is a sequence diagram illustrating a flow of processing whereby the UE 100 terminates the virtual roaming according to the exemplary embodiment of the present invention.

In step S901, the request sending unit 107 of the UE 100 (see FIG. 3) sends a redirection inactivation request to the VRSF 200. The redirection inactivation request instructs the VRSF 200 to inactivate virtual roaming for bob@mobile.net. The VRSF may instruct the CSCF 302 to stop forwarding the messages addressed to bob@mobile.net by deleting the relevant IFC. This request is protected by, for example, the GBA. The request receiving unit 203 of the VRSF 200 (see FIG. 4) receives the redirection inactivation request.

In step S902, the request receiving unit 203 acknowledges the redirection inactivation request.

In step S903, the UE 100 sends a SIP de-Register message to the IG 401 by means of the WLAN adapter 102.

In step S904, the IG 401 sends an IMS de-Register message to the CSCF 502 with regard to user-x@fix.net, which was allocated to the UE 100 in step S602 of FIG. 6.

In steps S905-S906, a 200 OK message is eventually sent back from the CSCF 502 to the UE 100 via the IG 401.

ADVANTAGES OF THE PRESENT INVENTION

The present invention is advantageous in that, even if the mobile IMS network 300 does not have a roaming agreement with the fixed IMS network 500, the UE 100, which can communicate with the mobile IMS network 300 via the mobile access network 301, can "virtually" roam into another network (i.e., the fixed IMS network 500) and can be provided with services from the mobile IMS network 300 via another access network (i.e., the fixed access network 501).

The other, non-limiting advantages are as follows:

QoS over the fixed access network 501 for services between the UE 100 and the mobile IMS network 300 is supported.

The configurations and procedures of the present invention can be implemented in any network without any changes to other networks. That is, it is not necessary to modify the fixed IMS network 500 and the fixed access network 501.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A service node configured to serve a first user node in a first network, wherein the first network includes a control node and is configured to communicate with a second network including a second user node, the service node comprising:

a request receiving circuit configured to receive, from the first user node, a redirection request including a first user identity that identifies the first user node in the first network and a second user identity that identifies the second user node in the second network, the redirection request requesting that messages directed to the first user identity be redirected to the second user identity;

a storing circuit configured to store an association of the first user identity and the second user identity;

a message receiving circuit configured to receive a message from the control node;

a determining circuit configured to determine whether the message includes the first user identity as a destination of the message, or whether the message includes auxiliary information that corresponds to the first user identity;

a modifying circuit configured to:

modify the destination of the message to be the second user identity, based on the stored association, if the determining circuit determines that the message includes the first user identity as the destination, and modify a source of the message to be the first user identity, based on the auxiliary information, if the determining circuit determines that the message includes the auxiliary information; and a sending circuit configured to send the modified message to the control node;

wherein:

the first network is a first IP Multimedia Subsystem (IMS) network;

the second network is a second IMS network;

the first user identity is an IMS Public User Identity (IMPU) of the first user node;

the second user identity is an IMPU of the second user node;

the message is a Session Initiation Protocol (SIP) Request message;

the control node comprises a Serving Call Session Control Function (S-CSCF);

and the modifying circuit is configured to modify the message including the auxiliary information so that the first user identity is included in a P-Asserted-Identity header of the message.

2. The service node according to claim 1, wherein:

the request receiving circuit is configured to generate the auxiliary information and to send that auxiliary information to the first user node; and the storing circuit is configured to store the auxiliary information in association with the first user identity.

3. The service node according to claim 1, wherein:

the storing circuit is configured to store one or more network identities, each identifying a network which the first user node can roam into; and the service node further comprises an informing circuit configured to inform, in response to a query including a network identity and based on the one or more stored network identities, the first user node whether or not the first user node can roam into a network that is identified by the network identity included in the query.

4. A service node configured to serve a first user node in a first network, wherein the first network includes a control node and is configured to communicate with a second network including a second user node, the service node comprising:
   a request receiving circuit configured to receive, from the first user node, a redirection request including a first user identity that identifies the first user node in the first network and a second user identity that identifies the second user node in the second network, the redirection request requesting that messages directed to the first user identity be redirected to the second user identity;
   a storing circuit configured to store an association of the first user identity and the second user identity;
   a message receiving circuit configured to receive a message from the control node;
   a determining circuit configured to determine whether the message includes the first user identity as a destination of the message, or whether the message includes auxiliary information that corresponds to the first user identity;
   a modifying circuit configured to:
   modify the destination of the message to be the second user identity, based on the stored association, if the determining circuit determines that the message includes the first user identity as the destination, and
   modify a source of the message to be the first user identity, based on the auxiliary information, if the determining circuit determines that the message includes the auxiliary information; a sending circuit configured to send the modified message to the control node; and
   an instructing circuit configured, upon receipt of the redirection request by the request receiving circuit, to instruct the control node to forward to the service node messages that include the first user identity as the destination of the messages;
   wherein the request receiving circuit is configured to receive, from the first user node, a redirection inactivation request including the first user identity; and
   wherein the instructing circuit is configured to instruct, upon receipt of the redirection inactivation request by the request receiving circuit, the control node to stop forwarding messages including the first user identity as the destination of the messages to the service node.

5. A service node configured to serve a first user node in a first network, wherein the first network includes a control node and is configured to communicate with a second network including a second user node, the service node comprising:
   a request receiving circuit configured to receive, from the first user node, a redirection request including a first user identity that identifies the first user node in the first network and a second user identity that identifies the second user node in the second network, the redirection request requesting that messages directed to the first user identity be redirected to the second user identity, wherein the redirection request includes one or more service identifiers, each identifying a service type;
   a storing circuit configured to store an association of the first user identity and the second user identity;
   a message receiving circuit configured to receive a message from the control node, wherein the message identifies a service type of a service requested by the message;
   a determining circuit configured to determine whether the message includes the first user identity as a destination of the message, or whether the message includes auxiliary information that corresponds to the first user identity;
   a modifying circuit configured to:
   check a service type identified by the message;
   modify the destination of the message to be the second user identity, based on the stored association, if the determining circuit determines that the message includes the first user identity as the destination and the message identifies a service type corresponding to one of the service identifiers included in the redirection request, and
   modify a source of the message to be the first user identity, based on the auxiliary information, if the determining circuit determines that the message includes the auxiliary information; and
   a sending circuit configured to send the modified message to the control node.

6. A method of controlling a service node configured to serve a first user node in a first network, wherein the first network includes a control node and is configured to communicate with a second network including a second user node, the method comprising:
   receiving, from the first user node, a redirection request including a first user identity that identifies the first user node in the first network and a second user identity that identifies the second user node in the second network, the redirection request requesting that messages directed to the first user identity be redirected to the second user identity; storing an association of the first user identity and the second user identity; receiving a message from the control node;
   determining whether the message includes the first user identity as a destination of the message, or whether the message includes auxiliary information that corresponds to the first user identity;
   modifying the destination of the message to be the second user identity, based on the stored association, if the message includes the first user identity as the destination of the message;
   modifying a source of the message to be the first user identity, based on the auxiliary information, if the message includes the auxiliary information; and
   sending the modified message to the control node;
   wherein:
   the first network is a first IP Multimedia Subsystem (IMS) network;
   the second network is a second IMS network;
   the first user identity is an IMS Public User Identity (IMPU) of the first user node;
   the second user identity is an IMPU of the second user node;
   the message is a Session Initiation Protocol (SIP) Request message;
   the control node comprises a Serving Call Session Control Function (S-CSCF); and modifying the source of the message comprises modifying the message so that the first user identity is included in a P-Asserted-Identity header of the message.

7. The method according to claim 6, further comprising generating the auxiliary information, sending that auxiliary information to the first user node, and storing the auxiliary information in association with the first user identity.

8. The method according to claim 6, further comprising:
   storing one or more network identities, each identifying a network which the first user node can roam into; and informing, in response to a query including a network identity and based on the one or more stored network identities, the first user node whether or not the first user node can roam into a network that is identified by the network identity included in the query.

9. A method of controlling a service node configured to serve a first user node in a first network, wherein the first network includes a control node and is configured to communicate with a second network including a second user node, the method comprising:
receiving, from the first user node, a redirection request including a first user identity that identifies the first user node in the first network and a second user identity that identifies the second user node in the second network, the redirection request requesting that messages directed to the first user identity be redirected to the second user identity;
storing an association of the first user identity and the second user identity; receiving a message from the control node;
determining whether the message includes the first user identity as a destination of the message, or whether the message includes auxiliary information that corresponds to the first user identity;
modifying the destination of the message to be the second user identity, based on the stored association, if the message includes the first user identity as the destination of the message;
modifying a source of the message to be the first user identity, based on the auxiliary information, if the message includes the auxiliary information;
sending the modified message to the control node; upon receipt of the redirection request, instructing the control node to forward to the service node messages that includes the first user identity as the destination of the messages; and
receiving, from the first user node, a redirection inactivation request including the first user identity, and instructing, upon receipt of the redirection inactivation request, the control node to stop forwarding messages that include the first user identity as the destination of the messages to the service node.

10. A method of controlling a service node configured to serve a first user node in a first network, wherein the first network includes a control node and is configured to communicate with a second network including a second user node, the method comprising:
receiving, from the first user node, a redirection request including a first user identity that identifies the first user node in the first network and a second user identity that identifies the second user node in the second network, the redirection request requesting that messages directed to the first user identity be redirected to the second user identity, wherein the redirection request includes one or more service identifiers, each identifying a service type;
storing an association of the first user identity and the second user identity; receiving a message from the control node, wherein the message identifies a service type of a service requested by the message;
determining whether the message includes the first user identity as a destination of the message, or whether the message includes auxiliary information that corresponds to the first user identity; checking a service type identified by the message;
modifying the destination of the message to be the second user identity, based on the stored association, if the message includes the first user identity as the destination of the message and the message identifies a service type corresponding to one of the service identifiers included in the redirection request;
modifying a source of the message to be the first user identity, based on the auxiliary information, if the message includes the auxiliary information; and
sending the modified message to the control node.

11. A first user node configured to communicate with a service node, a first control node, and a second user node, the service node and first control node included in a first network, and the second user node included in a second network that also includes a second control node, the first user node comprising:
a retrieving circuit configured to retrieve, from a memory, a first user identity that identifies the first user node in the first network;
a user identity receiving circuit configured to receive, from the second user node, a second user identity that identifies the second user node in the second network;
a registering circuit configured to register the second user identity with the second control node via the second user node;
a request sending circuit configured to send, to the service node, a redirection request that includes the first user identity and the second user identity, the redirection request requesting that messages directed to the first user identity be redirected to the second user identity; and
a message sending circuit configured to send, to the second user node, a message that includes a service node identity and auxiliary information, the service node identity identifying the service node in the first network as a node through which the message is to be routed, and the auxiliary information corresponding to the first user identity;
wherein:
the first network is a first IP Multimedia Subsystem (IMS) network;
the second network is a second IMS network;
the first user identity is an IMS Public User Identity (IMPU) of the first user node; the second user identity is an IMPU of the second user node;
the service node identity is a Uniform Resource Identifier (URI) of the service node;
the memory is a Universal Integrated Circuit Card (UICC) that stores an IMS Subscriber Identity Module (ISIM) maintaining the first user identity;
the message is a Session Initiation Protocol (SIP) Request message;
the first control node comprises a first Serving Call Session Control Function (S-CSCF);
the second control node comprises a second S-CSCF; and
the message includes the service node identity in a Route header of the message.

12. The first user node according to claim 11, wherein the request sending circuit is configured to receive the auxiliary information from the service node.

13. The first user node according to claim 11, wherein:
the user identity receiving circuit is configured to receive, from the second user node, one or more service identifiers, each identifying a service type; and the request sending circuit is configured to send all or a part of the one or more service identifiers to the service node.

14. The first user node according to claim 13, wherein:
the message identifies a service type of a service requested by the message; and the message sending circuit is configured to send the message to the second user node if the message identifies a service type corresponding to one of the service identifiers sent to the service node, and to otherwise send the message to the first control node.

15. The first user node according to claim 11, further comprising:
a network identity receiving circuit configured to receive a network identity that identifies the second network; and
an asking circuit configured to ask the service node whether or not the first user node can roam into the second network identified by the network identity.

16. A method for controlling a user node that is configured to communicate with a service node, a first control node, and a second user node, the service node and first control node included in a first network, and the second user node included in a second network that also includes a second control node, the method comprising:
retrieving, from a memory, a first user identity that identifies the first user node in the first network;
receiving, from the second user node, a second user identity that identifies the second user node in the second network;
registering the second user identity with the second control node via the second user node;
sending, to the service node, a redirection request including the first user identity and the second user identity, the redirection request requesting that messages directed to the first user identity be redirected to the second user identity; and
sending, to the second user node, a message that includes a service node identity and auxiliary information, the service node identity identifying the service node in the first network as a node through which the message is to be routed, and the auxiliary information corresponding to the first user identity;
wherein:
the first network is a first IP Multimedia Subsystem (IMS) network;
the second network is a second IMS network;
the first user identity is an IMS Public User Identity (IMPU) of the first user node;
the second user identity is an IMPU of the second user node;
the service node identity is a Uniform Resource Identifier (URI) of the service node;
the memory is a Universal Integrated Circuit Card (UICC) that stores an IMS Subscriber Identity Module (ISIM) maintaining the first user identity;
the message is a Session Initiation Protocol (SIP) Request message;
the first control node comprises a first Serving Call Session Control Function (S-CSCF);
the second control node comprises a second S-CSCF; and
the message includes the service node identity in a Route header of the message.

17. The method according to claim 16, further comprising receiving the auxiliary information from the service node.

18. The method according to claim 16, further comprising: receiving, from the second user node, one or more service identifiers, each identifying a service type; and sending all or a part of the one or more service identifiers to the service node.

19. The method according to claim 18, wherein the message identifies a service type of a service requested by the message, and wherein sending the message comprises sending the message to the second user node if the message identifies a service type corresponding to one of the service identifiers sent to the service node, and otherwise sending the message to the first control node.

20. The method according to claim 16, further comprising: receiving a network identity that identifies the second network; and asking the service node whether or not the first user node can roam into the second network identified by the network identity.

* * * * *

UNITED STATES PATENT AND TRADEMARK OFFICE
CERTIFICATE OF CORRECTION

PATENT NO.         : 8,661,097 B2
APPLICATION NO.    : 13/123251
DATED              : February 25, 2014
INVENTOR(S)        : Kato et al.

Page 1 of 1

It is certified that error appears in the above-identified patent and that said Letters Patent is hereby corrected as shown below:

In the Specification

In Column 8, Line 43, delete "ICS's" and insert -- ICSIs --, therefor.

Signed and Sealed this
Eighth Day of July, 2014

Michelle K. Lee
*Deputy Director of the United States Patent and Trademark Office*